3,262,920
LITHIUM CATALYSIS OF VINYL ESTER POLYMERIZATION
Donald J. Kelley, West Springfield, Mass., assignor, by mesne assignments, to Monsanto Company, a corporation of Delaware
No Drawing. Filed Dec. 29, 1961, Ser. No. 163,093
4 Claims. (Cl. 260—89.1)

This invention relates to the polymerization of vinyl ester monomers. More particularly, it relates to the polymerization of these monomers in the presence of metallic lithium.

It is well known that alkali metals and their alkyl derivatives will catalyze the polymerization of many vinyl monomers. For instance, metallic lithium has been employed in this fashion to polymerize such monomers as conjugated diene hydrocarbons, styrene, acrylic esters and methacrylonitrile. However, it has not been found possible heretofore to create polymers of vinyl esters through the agency of elemental lithium.

According to the present invention, this may be done by subjecting a vinyl ester monomer, in bulk or dissolved in an appropriate organic solvent, to the action of finely divided lithium metal in a system that has been purged of water, oxygen and acidic substances. The polymerization, it is believed, is effected by a free radical mechanism.

That polymerization can occur at all is rather surprising because of the great reactivity of lithium metal and in view of the fact that both alkyl lithium and sodium metal will react with monomers such as vinyl acetate and thereby render themselves unavailable as polymerization catalysts. And that is not all. Even after polymerization, assuming that it did take place, one might expect the catalyst to reduce the polymer to polyvinyl alcohol, ketene and other aldehydes, depending on the nature of the polymer contemplated. Another reaction which could very well take place once the polymer is obtained would be hydrolysis to polyvinyl alcohol following the introduction of water into the system while lithium is still present; this latter development would not necessarily be undesirable, of course, if that were the product sought.

The monomers to which the present lithium polymerization process has been applied successfully are the vinyl esters which do not contain any ionizable hydrogen atoms in their molecule. Particularly adapted to the process are those vinyl esters of alkanoic acids containing up to about 20 carbon atoms in the acid moiety of the molecule and of aromatic acids or alicyclic acids with a carbon atom content ranging from 7 to about 20. Examples of such esters include vinyl acetate, vinyl propionate, vinyl butyrate, vinyl chloroacetate, vinyl trimethylacetate, vinyl methoxyacetate, vinyl palmitate, vinyl stearate, vinyl benzoate, vinyl phenylacetate, vinyl α- and β-naphthoates, vinyl hexahydrobenzoate, and others.

The catalyst employed in this invention is a very finely divided lithium metal powder. For convenience, it is handled in the form of a 30% by weight dispersion in mineral oil (55%)-petrolatum (15%), at least 90% of the particles being smaller than 25 microns in diameter. The metal should be present in the polymerization mixture in catalytic amount. About 1% of the weight of monomers has been used generally in the examples; this particular quantity can not be regarded as critical, however, since only the surface of the metal particles is involved in the reaction.

The polymerization may be effected in bulk or in solution. Whichever is the method chosen, it is mandatory that the following conditions be strictly observed: (1) the monomers employed should be as pure as possible; (2) the reaction system must be free of moisture, oxygen and acidic compounds. The purity of polymerization grade vinyl acetate has been found sufficient for the process. Other commercial vinyl monomers, such as vinyl propionate, may need to be fractionally distilled before use. It may also be necessary to wash certain commercial grades of monomers with a dilute (5%) solution of sodium hydroxide prior to fractional distillation in order to remove traces of acidic impurities.

When the polymerization is to be carried out in solution, a solvent should be selected that is anhydrous and inert to lithium. Preferably also, in order to maintain the homogeneity of the system, the solvent should dissolve the polymer. Reagent grade benzene refluxed for four hours in the presence of sodium wire and fractionally distilled affords an example of a preferred solvent. A 1:2 weight proportion of solvent to monomers has been found convenient in most cases. This proportion may be altered significantly of course on the counts of economy, degree of polymerization, nature and quantity of polymer formed, and so on.

Polymerizations employing the catalyst of this invention may be carried out within a relatively wide range of temperatures and pressures, for example at temperatures of −80° to 135° C. and pressures between 1 and 400 atmospheres. Optimum conditions, however, appear to be within the temperature range of 15–70° C. and atmospheric pressure. Reaction time will be influenced of course by the nature of the monomer, the temperature and the pressure of the system and the presence or absence of a solvent. In this respect, a relatively long induction period may be noticed with certain monomers when polymerized in bulk at room temperature.

It is desirable to agitate the polymerization mixture continually during the reaction. This, in addition to maintaining the catalyst maximally dispersed throughout the system, aids the polymerization in keeping the surface of the lithium particles clean and shiny.

Finally, the reaction system should be purged of oxygen by flushing with an inert gas. Dried, prepurified grade nitrogen is an example of an acceptable gas.

The isolation of the polymer produced, whether by filtration, by dilution with a nonsolvent or by any other means should obviously be carried out under anhydrous conditions. Otherwise, due to the action of moisture on lithium, lithium hydroxide will be formed in sufficient amount to hydrolyze either partially or completely the polyvinyl ester to polyvinyl alcohol. This is not to say, however, that such an eventuality is always undesirable.

The examples that follow will serve to illustrate further the principles and the practice of the invention; they are not to be construed, in any event, as limitations thereof.

In the examples, the degree of polymerization of the polymer formed is reflected by the intrinsic viscosity ($\eta$). This value is determined by extrapolating the specific viscosity of the polymer to zero concentration. To obtain these measurements, a sample of the polymer is dissolved in an appropriate solvent, with heat if necessary, cooled to 20° C. and its viscosity is measured relative to that of the pure solvent at the same temperature. The following formulae are then applied to the measurements:

Let
$T$=flow time of polymer solution (seconds)
$T_o$=flow time of solvent (seconds)
$\eta_{rel}$=relative viscosity=$T/T_o$
$\eta_{sp}$=specific viscosity=$\eta_{rel}-1$ $$\eta = \text{intrinsic viscosity} = \lim_{C \to 0} \text{ of } \left(\frac{\eta_{sp}}{C}\right)$$

where C is the concentration of the polymer in grams/100 ml. solution. Unless specified otherwise in the examples, the solvent used for these determinations was benzene.

All weights and yields in the examples are given in grams and, with yields, the percentage of monomer input converted to polymer is also given.

Examples which do not feature a reaction temperature were initiated at room temperature and were allowed to proceed adiabatically.

EXAMPLE 1

Polymerization of vinyl acetate

Polymerization grade vinyl acetate, 17.0 g., was charged into a glass reaction vessel along with 10.1 g., dry reagent grade benzene and 1.0 g. commercial 30% lithium metal dispersion in mineral oil-petrolatum. A Teflon-coated magnetic stirring bar was placed in the vessel. The contents were flushed for several minutes with a stream of dried prepurified grade nitrogen and the vessel was sealed by means of an aluminum foil covered rubber gasket. The reaction mixture was agitated in a nitrogen atmosphere for 42 hours at 25° C. The resulting solution was then filtered to remove the lithium metal and the filtrate was poured into a large excess of stirred hexane, a nonsolvent, in order to precipitate the polymer. The precipitated polymer was filtered off and dried for several hours under reduced pressure at about 60° C.

This preparation yielded 2.6 g. polymer, a 15% conversion of the original monomer. The intrinsic viscosity was determined in an Ubellohde viscosimeter at 20° C., in benzene, and was found to be 0.86.

EXAMPLE 2

Polymerization of vinyl acetate

In this and the following examples, the polymerization and recovery procedures employed are essentially those of Example 1. Undue repetition will therefore be avoided by listing only the charge compositions, the yields and other significant pertinent changes.

Charge:
  26.5 g. vinyl acetate
  13.4 g. tetrahydrofuran
  0.75 g. lithium dispersion Reaction conditions: agitated under nitrogen for 16.2 hours at 55–60° C.

Polymer yield: 0.99 g.; 16.3% conversion; $\eta=0.20$.

EXAMPLE 3

Polymerization of vinyl acetate

Charge:
  20.2 g. vinyl acetate
  10.0 g. benzene
  0.75 g. lithium dispersion

Reaction conditions: agitated under nitrogen for 3.1 hours at 49–55° C.

Polymer yield: 1.64 g.; 8.1% conversion; $\eta=0.92$.

EXAMPLE 4

Polymerization of vinyl propionate

Charge:
  9.2 g. vinyl propionate
  5.3 g. benzene
  0.6 g. lithium dispersion

Reaction conditions: agitated under nitrogen for 27.7 hours at 48–60° C.

Polymer yield: 1.6 g.; 17.5% conversion; $\eta=0.27$.

EXAMPLE 5

Polymerization of vinyl chloroacetate

Charge:
  6.0 g. vinyl chloroacetate
  0.3 g. lithium dispersion
  No solvent

Reaction conditions: agitated under nitrogen for 40 hours at room temperature.

Polymer yield: 0.54 g.; 9.0% conversion; $\eta=0.49$ (in acetone at 20° C.).

Other vinyl ester monomers such as vinyl benzoate were polymerized by the present process. These runs are not reported here since, although there was polymer obtained which cannot be ascribed to thermal polymerization because of the low temperatures employed, the presence of interfering impurities in the particular monomer preparations reduced the yields remarkably.

Variations in yield could be observed which appeared to be related to the origin of the monomer and the type of impurity dependent upon that origin.

In general, the polymers made by the process of this invention exhibited solubility and thermal softening properties similar to polymers of equal intrinsic viscosity prepared according to other known processes. The polyvinyl alcohol obtained by complete methanolysis of the lithium produced vinyl ester polymers was found to be easily soluble in water.

The catalysis of vinyl ester polymerization by lithium offers the convenience of low temperature processing where this is desired and permits the production of polymers having a particular end group, the latter being donated by the initiating species. Other advantages of the process will be evident to those skilled in the art.

What is claimed is:

1. A process for the homopolymerization of ethylenically unsaturated vinyl ester monomers selected from the group consisting of the vinyl esters of alkanoic, alicyclic and aromatic acids containing up to about 20 carbon atoms and characterized by the absence of acidic functions in their molecules which comprises subjecting the monomers to a catalytic amount of pulverized lithium metal at a temperature in the range of from about −80° C. to about 135° C. and at pressures ranging from about 1 to about 400 atmospheres, wherein the process is carried out in the absence of moisture, oxidizing and acidic substances.

2. The process of claim 1 carried out in a dry inert organic solvent.

3. The process of claim 1 wherein the vinyl ester monomer is vinyl acetate.

4. A process for homopolymerizing vinyl acetate consisting substantially in (a) charging a reactor vessel under moisture-free and acid-free conditions with a mixture comprising, in parts by weight, 100 parts monomer, 50 parts benzene and 1 part 30% lithium metal dispersion, (b) flushing the mixture with a dry purified inert gas, (c) agitating the mixture in the inert gas atmosphere for a period of 2 to 50 hours at temperatures ranging from 15 to 70° C., (d) removing the lithium catalyst under anhydrous conditions and (e) isolating the polymerized product.

References Cited by the Examiner

UNITED STATES PATENTS

| | | | |
|---|---|---|---|
| 2,471,959 | 5/1949 | Hunt | 260—93.5 |
| 3,050,511 | 8/1962 | Swarc | 260—93.5 |
| 3,055,860 | 9/1962 | Baer et al. | 260—93.5 |
| 3,088,939 | 5/1963 | Miller | 260—88.7 |

OTHER REFERENCES

Kawai et al.: Journal of Polymer Science, vol. 46, p. 273 (1960).

Gaylord et al.: "Linear and Stereoregular Additional Polymers," pp. 243–245, 406, 407, 513–514 (Interscience, N.Y.).

JOSEPH L. SCHOFER, *Primary Examiner.*

LOUISE P. QUAST, *Examiner.*

J. F. McNALLY, *Assistant Examiner.*